This invention relates to ceramic stains giving a clean pink color to fired glazes and like ceramic compositions containing same. It also relates to a process for preparing said stains.

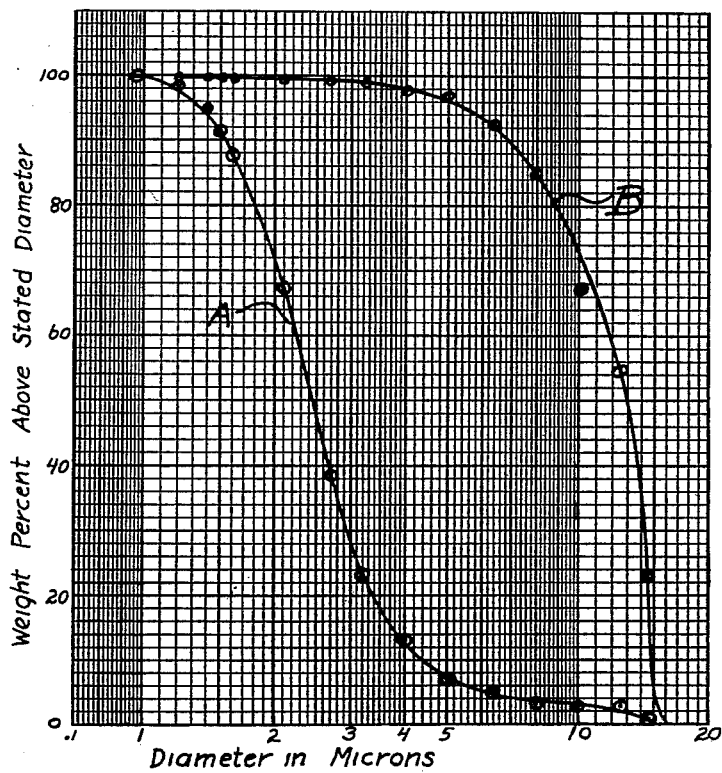
Fig. I
JOHN E. MARQUIS
ROBERT E. CARPENTER
INVENTORS

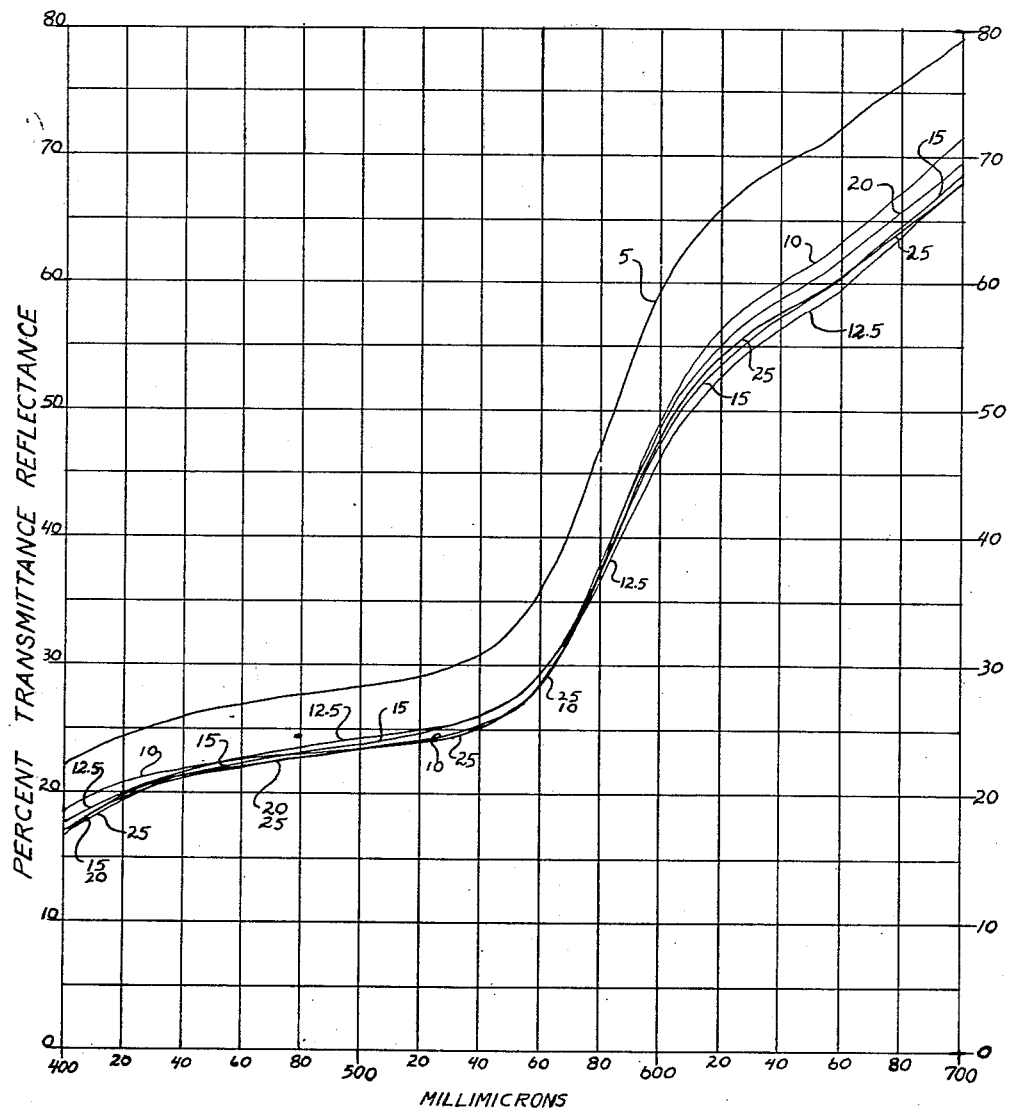
Fig. II 3,189,475
PINK CERAMIC STAIN AND PROCESS
John E. Marquis, Towson, and Robert E. Carpenter, Baltimore, Md., assignors to The Glidden Company, Cleveland, Ohio, a corporation of Ohio
Filed Dec. 20, 1962, Ser. No. 246,148
14 Claims. (Cl. 106—299)

In brief, our stains are solid-state reaction products involving silica, iron oxide and zirconia as the main ingredients, and are reaction products which have been oxidatively calcined, then crushed and micropulverized for introduction into a glaze or other ceramic composition.

Iron oxide and zirconia have been combined and reacted heretofore to make ceramic stains but the resulting colors have been on the tan side, e.g. buff, suntan, coral, etc. We have now discovered that clean, bright, pleasing pink colors can be secured by combining and reacting together in a controlled way the ingredients and proportions thereof identified hereinafter.

Accordingly it is an object of this invention to provide a novel ceramic stain of the silica/iron oxide/zirconia variety having compositional and other control limits identified hereinafter.

It is another object to provide a process for preparing said ceramic stain.

It is a further object to provide a glaze or like ceramic composition containing said stain which when fired, exhibits a clean, bright, pleasing pink color.

These and other objects will be understood more fully from the following description and illustrative examples.

The ceramic industry has adopted certain pink color standards which have been difficult heretofore to match in iron oxide/zirconia type stains. The latter stains have consistently been off-color, mainly on the tan side. We have now discovered how to formulate and react iron hydroxide or oxide, silica, zirconia, and alkaline silicofluoride so as to secure a solid-state reaction product (stain) which has the color qualities needed to yield clean, bright pink ceramic glazes and fired ceramic articles.

Our stains are formulated from the following kinds and amounts of materials:

| Ingredients | Limits (wt. percent) | | |
|---|---|---|---|
| | Min. | Max. | Preferred |
| Zirconia ($ZrO_2$) | 50 | 75 | 56–62 |
| Silica ($SiO_2$) | 13 | 40 | 24–30 |
| Alkaline silicofluoride (e.g. Na, K, Li) | 1 | 10 | 1–5 |
| Ferric oxide [1] ($Fe_2O_3$) | 2.5 | 25 | 5–15 |

[1] And/or a chemically-equivalent amount of yellow iron hydroxide: $2Fe(OH)_3 \rightarrow Fe_2O_3 + 3H_2O$.

The zirconia can exist in any of its common crystal forms, e.g. monoclinic, cubic or mixed monoclinic/cubic, although we prefer to have it mainly in the monoclinic form. It is known, however (e.g. U.S. Patents 2,578,748 and 2,721,115), that zirconia can be displaced from zircon by treating the latter at elevated temperatures with minor amounts of alkaline earth and/or other metal oxides to secure stable crystal modification (e.g. stable cubic or stable mixed cubic/monoclinic). Such zirconias are low-level solid solutions of the treating oxides and when secured from zircon or other zirconia material by treatment with calcium oxide or carbonate, are commercially available with CaO contents below 1% by weight. We accordingly prefer to use such CaO-containing, mainly-monoclinic zirconias in making our stains. Moreover, such commercially-available CaO-containing zirconias possess the critical particle size distribution which is an essential parameter leading to our clean pink colors. Curve A of FIGURE 1 is typical of the needed particle size distribution; that is, it illustrates a distribution wherein all of the particles are above 1 micron in average diameter and wherein less than about 7% are coarser than 5 microns. The reason(s) why such particle size distribution is so critical in yielding clean pink colors need(s) further elucidation, but we have established by extensive comparative tests that departure from a particle size distribution between 1 and about 6 microns invariably results in stains giving off-colors.

It should be understood that the needed particle size distribution in the starting zirconia can be secured by appropriate comminuting operations well-known to those skilled in the art. The zirconias used in practicing the invention are preferably of a purity above 98% when any hafnium oxide therein is counted as zirconia. Thus, other metallic oxides such as result from the practices disclosed in U.S. Patent 2,578,748, supra, should be kept below about 2% and more preferably below about 1%, by weight. We have found that such impurities tend to reduce the strength of our stain colors, about in proportion to the amount of impurity.

The silica used in preparing our stains need only be in such a comminuted condition that substantially all of the particles are finer than 325 mesh (Tyler Standard Sieve). Our preferred silica is crystalline and is specified to be in a finely divided condition so as to enhance the rate of reaction when the stain formulation is calcined. More than minor amounts of the very fine silicas known in the trade as "colloidal" or "semi-colloidal" should ordinarily be avoided because of the inherently large surface areas of said very fine silicas.

The silicofluoride needs little comment other than to point out that it is a mineralizer and hence should be initially in a finely-divided condition so that it can be disseminated as uniformly as possible through the mixture prior to calcining, particularly where a short calcining period is sought. Sodium silicofluoride is preferred.

The red ferric oxide reactant used in preparing our stains is in a powdery condition or can be secured in-situ from powdery yellow iron hydroxide, as indicated above. The hydroxide appears to provide the strongest and best colors, and for this reason we prefer to use it.

PREPARING THE STAIN

The kinds and amounts of ingredients specified in the formulation supra are mixed together quite thoroughly, as in a mechanical blender, and then passed through a micropulverizer. The resulting mixture is then charged into ceramic crucibles or saggers, covered, and placed in a kiln (which may be periodic or continuous) and therein fired in such a way that the charge is maintained at about 1800°–2300° F. for 1–5 hours, preferably at 2050° F. for about three hours. During this firing period the furnace atmosphere is maintained oxidizing and the crucibles or saggers are covered so as to secure the necessary solid-state reaction products. Following calcination the crucibles or saggers are cooled at any convenient cooling rate, after which the contents is removed and passed through a mechanical blender to break up lumps and to ensure mixing, and then is passed through a micropulverizer to reduce the particles to a size appropriate for addition to a ceramic glaze, engobe, or like ceramic composition e.g. less than 100 mesh.

USE OF THE STAIN

It will be appreciated that the stain can be added to any ceramic mass which is to be fired, thereby to impart color to said mass. The strength of color depends to some extent on the amount of ferric oxide in the particular stain being used, and also depends on the relative proportion of the stain to the mass to which it is added as colorant. Five percent ferric oxide in the stain leads to light pinks, while large amounts of ferric oxide up to about 12.5–15% give stronger colors. The strength does not increase proportionately as the ferric oxide content is increased from about 10 to 25%. As to the effect of stain dilution, a very delicate color can be secured by adding only 0.25% (wt.) of the stains to a glaze. Five to ten percent gives moderately strong pinks and represents a range appropriate for general use. However, if stronger colors are wanted, the amount of stain can be increased to 20% (wt.) or more. Those skilled in the art will recognize also that the color imparted to a ceramic composition by the stains of the invention can be further varied by manipulation of the composition or glaze formulation, e.g. by varying the percentage of opacifier and clay.

The following examples illustrate the principles of the invention and include the best modes presently known to us for practicing those principles.

*Example 1*

A stain of the invention is prepared from the following kinds and amounts of starting materials:

| | Percent by wt. |
|---|---|
| CaO-containing zirconia [1] | 58.2 |
| Minus 325 mesh silica | 25.9 |
| Sodium silicofluoride, powd. | 2.3 |
| Yellow iron hydroxide, powd. | 13.6 |
| | 100.0 |

[1] A commercial product said to be produced under U.S. Patent 2,578,784 and showing by analysis a CaO content of about 0.05–0.7% (here typically 0.5%), by weight. X-ray diffraction tests show it to be a mixture composed mainly of monoclinic zirconia crystals with minor amounts of cubic crystals. Coulter Counter tests for particle size distribution establish the material as conforming essentially to curve A shown in FIGURE 1. The product contains 1–2% hafnium oxide as a normal impurity in common with most zirconias.

The ultimate analysis of a fired stain resulting from the above formulation is as follows (hafnium oxide being counted as $ZrO_2$):

| | Percent (wt.) |
|---|---|
| $ZrO_2$ | 59.0 |
| $SiO_2$ | 26.9 |
| $Fe_2O_3$ | 11.8 |
| $Na_2O$ | 0.7 |
| F | 1.4 |
| CaO | 0.2 |
| | 100.0 |

A stain of this ultimate chemical composition is prepared by blending the stated starting materials together, then passing the resulting mixture through a micropulverizer, then charging the pulverized mixture to clay crucibles, covering the latter and then firing them in a kiln wherein the contents is heated to 2050° F. and is held at this temperature for three hours in an oxidizing atmosphere. The crucibles are then allowed to cool to about room temperature, and the contents of each is removed. It should be noted that the contents at this stage is a solid-state reaction product which is granular-to-lumpy and which adheres little if any to the walls of the crucibles. Said reaction product is reddish brown in color and after being passed through a mechanical blender and micropulverizer it is a reddish brown powder or flour. The average particle size at this stage is about 10 microns.

*Example 2*

Part of the stain of Example 1, ground to —325 mesh, is added to a standard glaze formulation composed of the following kinds and amounts of materials:

| | Pounds |
|---|---|
| Commercial glaze frit [2] | 90 |
| Kaolin | 10 |
| Zirconium silicate (opacifier) | 10 |
| Stain | 5 |
| Water | 40 |

[2] Frit No. 5 of Table II below.

These materials are charged to a ball mill wherein they are milled to an appropriate fineness, after which a part of the resulting glaze is applied to ceramic tile, dried, and fired to cones 01 to 1 in the usual oxidizing kiln atmosphere. The resulting glazed tiles exhibit a clean, bright, pleasing pink color.

*Example 3*

Examples 1 and 2 are repeated except that the CaO-containing zirconia of Example 1 is replaced with commercial calcium carbonate-treated zirconia which by X-ray diffraction is found to consist mainly of monoclinic crystals. The replacing zirconia contains 0.5% CaO by weight and has a particle size distribution conforming essentially to curve A shown in FIGURE 1. Glazed ceramic tile secured in the manner of Example 2 by using the stain described herein exhibits a clean, bright pleasing pink color equaling that of the tiles of Example 2.

*Examples 4–9*

To secure tristimulus spectrophotometric reflectance curves for glazes prepared from stains of the invention containing progressively larger amounts of ferric oxide, the stain, glaze and glazed tile tests of Examples 1 and 2 were repeated except that the yellow ferric hydroxide contents of the stain formulations were made 5, 10, 12.5, 15, 20 and 25% by weight, while the ratios of all other components were held constant. The six formulations in weight percent, are shown in Table I.

TABLE I

| Example | 4 | 5 | 6 | 7 | 8 | 9 |
|---|---|---|---|---|---|---|
| CaO-treated $ZrO_2$ | 62.5 | 59.3 | 57.8 | 56.3 | 53.2 | 50.0 |
| Minus 325 mesh $SiO_2$ | 30.0 | 28.2 | 27.3 | 26.4 | 24.6 | 22.8 |
| $Na_2SiF_6$ | 2.5 | 2.5 | 2.4 | 2.3 | 2.2 | 2.2 |
| Yellow iron hydroxide | 5.0 | 10.0 | 12.5 | 15.0 | 20.0 | 25.0 |
| | 100.0 | 100.0 | 100.0 | 100.0 | 100.0 | 100.0 |

As noted in Example 2, the various stains were added at the rate of 5 lbs. per 100 lbs. of frit and clay which comprise the basic glaze formulation. The resulting glazed tile were then tested in a General Electric Spectrophotometer with a tristimulus integrator attached. The resulting curves are shown in FIGURE II and are labeled with the corresponding yellow iron hydroxide level. Referring now to FIGURE II, it will there be seen that 5% of iron hydroxide produced a glaze having the highest reflectance while 10–25% of iron hydroxide produced glazes of lower reflectances which were grouped so close to each other as to be practically identical. Moreover, all the curves are nearly "parallel" (i.e. of same general contour). Thus, the mass tones of the various glazes are so close to each other as to be nearly indistinguishable at the various iron hydroxide levels, the differences being observable mostly as differences in lightness or darkness (i.e. strength). That is, when seeing the six glazed tiles side by side, one observes that the glaze having 5% iron hydroxide in the stain is slightly lighter than the others, but that the color or mass tone of all is the same. This effect can be comprehended by thinking of a single color being diluted more or less with a pure white. This carry-through of mass tone is indicative of the presence in all stains of a uniform, monotone solid state reaction product which accounts for the "cleanness" of the color.

The curves of FIGURE II also show quite clearly that iron hydroxide levels between about 10% and 25% give little variation in observable mass tone or color.

A comparable series of curves, not shown, was prepared where the only differences between the stains of the two series were (a) the same variations in yellow iron hydroxide levels and (b) replacement of the specified CaO-containing zirconia with a coarser commercial zirconia having a particle size distribution represented by curve B of FIGURE I. The second series of curves showed a lower level of reflectance, a progressive reduction in brightness, and a progressive change of mass tone as the iron hydroxide increased from 5% to 25%. The only significant inversions in said progressions occurred in the blue range of 400–495 millimicrons where the 10% hydroxide curve showed a slightly higher reflectance than the 5% hydroxide curve, and in the range of 520–700 where the 15% hydroxide curve showed a slightly higher reflectance than the 12.5% curve, thus accounting for some of the observable variation in mass tone. Furthermore, the curves were higher in the red end (600–700 millimicrons), and essentially lower in the blue-green end (400–550 millimicrons). Thus, the coarser zirconia, for reasons not fully elucidated, fails to produce a monotone colorant and instead gives a plurality of colorants whose ratios change as the iron hydroxide level is changed. In other words, these changes in kinds and amounts of colorants account for the off-colors heretofore recognized in the art where the usual coarse zirconia is used. Stated another way, the stains of the present invention are easily and controllably reproducible in respect to the matching of glaze colors.

*Example 10*

When the stain of Example 1 is duplicated except for the replacement of the yellow iron hydroxide with its chemically-equivalent amount of red ferric oxide, a nearly identical stain is secured. When the stain is tested in the manner described in Example 2, the resulting glaze exhibits a clean, bright pink color, the strength of which is only slightly below that of Example 2.

FRITS

Example 2 refers to a commercial glaze frit. For convenience, five typical frit compositions are shown in Table II to illustrate the wide variations in composition needed for different kinds of end usage. The figures represent weight percent.

TABLE II.—FRIT COMPOSITIONS

| Frit No. | PbO | $K_2O$ | $Na_2O$ | CaO | MgO | BaO | ZnO | $Al_2O_3$ | $B_2O_3$ | $SiO_2$ | F |
|---|---|---|---|---|---|---|---|---|---|---|---|
| 1 | | | | 5.6 | | 27.4 | | 5.4 | 12.4 | 49.2 | |
| 2 | | 5.4 | 14.7 | 0.5 | | | 0.7 | 12.1 | 16.9 | 49.7 | 1.8 |
| 3 | 61.3 | | | | | | | 7.2 | | 31.5 | |
| 4 | | 4.0 | 1.6 | 14.9 | 0.6 | | 4.1 | 8.2 | 4.5 | 49.3 | |
| 5 | 11.3 | 2.4 | 4.0 | 5.9 | | | 13.4 | 7.4 | 6.5 | 53.0 | |
| | | | | | | | 9.5 | | | | |

Table III identifies the same frit compositions in terms of molar values.

TABLE III

| | Frit 1 | Frit 2 | Frit 3 | Frit 4 | Frit 5 |
|---|---|---|---|---|---|
| PbO | | | 1.0 | | .14 |
| $K_2O$ | | .18 | | | .07 |
| $Na_2O$ | .33 | .76 | | .05 | .18 |
| CaO | | .03 | | .48 | .29 |
| MgO | | | | .03 | |
| BaO | .67 | | | .05 | |
| ZnO | | .03 | | .31 | .32 |
| $Al_2O_3$ | .20 | .38 | .25 | .15 | .20 |
| $B_2O_3$ | .67 | .78 | | .12 | .26 |
| $SiO_2$ | 3.07 | 2.65 | 1.92 | 1.54 | 2.43 |
| F | | .29 | | | |

GLAZES

Three different glaze formulations are set forth in Table IV. Glaze A represents a typical glaze used in art pottery and other decorative forms. Glaze B is typical of glazes used in dinnerware and ceramic wall tile. Glaze C is typical of glazes used in the sanitary ware industry. It should be understood that the stains of this invention can be used at appropriate levels (e.g. 0.25%–20% or more) in any of the types of glazes represented by glazes A, B and C of Table IV, which glazes in turn can use any of the types of frits represented by Table II.

TABLE IV.—TYPICAL GLAZE COMPOSITIONS IN PARTS BY WEIGHT

| Glaze A | | Glaze B | | Glaze C | |
|---|---|---|---|---|---|
| Cone 06–Cone 02 (1,873° F.–2,100° F.) | | Cone 02–Cone 2 (2,100° F.–2,150° F.) | | Cone 7–Cone 10 (2,300° F.–2,426° F.) | |
| Frit 1 | 89.0 lbs | Frit 2 | 26.8 lbs | Frit 4 | 62.8 lbs |
| Clay | 11.0 lbs | Frit 3 | 11.0 lbs | Feldspar | 12.6 lbs |
| Stain | 5.0 lbs | Feldspar | 39.2 lbs | ZnO | 3.1 lbs |
| | | Clay | 13.0 lbs | Clay | 11.2 lbs |
| | | $CaCO_3$ | 10.0 lbs | $SiO_2$ | 10.3 lbs |
| | | Stain | 5.0 lbs | Stain | 5.0 lbs |

The basic glaze components are indicated by the brackets and constitute the base on which percentages of stain addition are computed; e.g. in all three glazes, the stain addition amounts to 5 percent by weight.

From the foregoing description of our invention, it will be apparent that we have provided a novel process and a novel solid-state reaction product, and that the latter is easily and uniformly reproducible as to its ability to impart clean pleasing pink color to fired ceramic articles and glazes.

Having described our invention, what we claim is:

1. A ceramic stain which is the solid state reaction product resulting from the oxidative calcination at 1800° F.–2300° F. for 1–5 hours of a uniform mixture of the following comminuted starting materials whose proportions are expressed in weight percent and total 100%:

| | Percent |
|---|---|
| Zirconia having a purity of at least 98% | 50–75 |
| Silica | 13–40 |
| Alkaline silicofluoride mineralizer | 2–10 |
| Ferric oxide ($Fe_2O_3$) | 2.5–25 | said zirconia having an average particle size and particle size distribution such that substantially all particles are between 1 and about 6 microns; and said silica consisting of particles finer than about 325 mesh.

2. A ceramic stain as claimed in claim 1 wherein said ferric oxide is produced in situ by using in said starting mixture an amount of yellow iron hydroxide which is chemically equivalent to 2.5–25% $Fe_2O_3$.

3. A ceramic stain as claimed in claim 2 wherein said zirconia contains up to 1% by weight of calcium oxide and consists mainly of monoclinic crystal forms of said CaO-containing zirconia.

4. A ceramic stain as claimed in claim 3 wherein said alkaline silicofluoride is sodium silicofluoride.

5. A ceramic stain as claimed in claim 3 wherein the zirconia is a calcium carbonate-treated zirconia containing about 0.05–0.7% calcium oxide, by weight; and wherein the particle size distribution of the zirconia conforms substantially to curve A of FIG. I.

6. A ceramic stain as claimed in claim 5 wherein the zirconia amounts to about 56–62% by weight; wherein the silica amounts to about 24–30%; wherein the sodium silicofluoride amounts to 1–5%; and wherein the ferric oxide amounts to about 5–15%, said percentages totalling 100%.

7. A ceramic stain as claimed in claim 1 wherein said zirconia amounts to about 56–62%; wherein the silica amounts to about 24–30%; wherein the alkaline silicofluoride amounts to about 1–5%; and wherein the ferric oxide amounts to about 5–15%, said percentages totalling 100%.

8. A ceramic stain as claimed in claim 7 wherein the solid state reaction product results from the oxidative calcination at 2050° F. for three hours of a uniform mixture of: about 58.2% by weight of calcium oxide-containing zirconia having a calcium oxide content of about 0.5% CaO by weight; about 25.9% by weight of minus 325 mesh silica; about 2.3% by weight of powdery sodium silicofluoride; and about 13.6% by weight of powdery yellow iron hydroxide.

9. A ceramic stain as claimed in claim 8 wherein the solid state reaction product, when analyzed chemically, consists essentially of about 59.0% zirconia, about 26.9% silica, about 11.8% ferric oxide, about 0.7% sodium oxide, about 1.4% fluorine and about 0.2% calcium oxide, all percentages being by weight.

10. The process of preparing a ceramic stain adapted to produce fired ceramic articles exhibiting a clean, bright pink color, which comprises the steps of: (A) providing a uniform starting mixture of the following comminuted materials whose proportions are expressed in weight percent; zirconium having a purity of at least 98% by weight and an average particle size and particle size distribution such that substantially all particles are between 1 and about 6 microns, 50–75%; silica 13–40%; alkaline fluosilicate as mineralizer, 2–10%; and ferric oxide 2.5–25%; (B) calcining said starting mixture in an oxidizing atmosphere at 1800° F.–2300° F. for 1–5 hours; (C) cooling said calcined mass and comminuting it to a powder.

11. The process as claimed in claim 10 wherein said ferric oxide is produced in situ by using in said starting mixture an amount of yellow iron hydroxide which is chemically equivalent to 2.5–25% $Fe_2O_3$.

12. The process as claimed in claim 11 wherein said mineralizer is sodium silicofluoride.

13. The process as claimed in claim 12 wherein said zirconia has a purity of at least 99% (when hafnium oxide is counted as zirconia) and wherein said zirconia is a calcium carbonate-treated zirconia having a calcium oxide content of about 0.05–0.7% CaO, by weight and consisting mainly of monoclinic crystals.

14. A glaze for ceramic articles which contains about 0.25–20% by weight of a stain as claimed in claim 1.

References Cited by the Examiner

UNITED STATES PATENTS

| | | | |
|---|---|---|---|
| 2,441,447 | 5/48 | Seabright | 106—299 |
| 3,046,150 | 7/62 | Jamieson | 106—299 |

FOREIGN PATENTS 384,473 12/32 Great Britain.

TOBIAS E. LEVOW, *Primary Examiner.*

UNITED STATES PATENT OFFICE
CERTIFICATE OF CORRECTION

Patent No. 3,189,475                                    June 15, 1965

John E. Marquis et al.

It is hereby certified that error appears in the above numbered patent requiring correction and that the said Letters Patent should read as corrected below.

Column 8, line 1, for "zirconium" read -- zirconia --.

Signed and sealed this 25th day of October 1966.

(SEAL)
Attest:

ERNEST W. SWIDER                               EDWARD J. BRENNER
Attesting Officer                                     Commissioner of Patents